(12) United States Patent
Caveney

(10) Patent No.: US 7,094,095 B1
(45) Date of Patent: Aug. 22, 2006

(54) STAIR-STEPPED ANGLED PATCH PANEL

(75) Inventor: Jack E. Caveney, Hinsdale, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 11/361,800

(22) Filed: Feb. 23, 2006

Related U.S. Application Data

(60) Provisional application No. 60/656,253, filed on Feb. 25, 2005, provisional application No. 60/765,316, filed on Feb. 3, 2006.

(51) Int. Cl.
*H01R 13/66* (2006.01)
*H01R 9/22* (2006.01)

(52) U.S. Cl. .................... 439/540.1; 439/719; 385/134

(58) Field of Classification Search ............ 439/540.1, 439/719; 385/134, 135, 55
See application file for complete search history.

(56) References Cited

U.S. PATENT DOCUMENTS

| | | | |
|---|---|---|---|
| 2,427,349 A | 9/1947 | Boynton | |
| 3,337,059 A | 8/1967 | Le Hoy | |
| 4,747,020 A | 5/1988 | Brickley et al. | |
| 5,011,257 A | 4/1991 | Wettengel et al. | |
| 5,127,082 A | 6/1992 | Below et al. | |
| 5,129,842 A | 7/1992 | Morgan et al. | |
| 5,303,519 A | 4/1994 | Mustee et al. | |
| RE34,955 E | 5/1995 | Anton et al. | |
| 5,415,296 A | 5/1995 | Wright | |
| 5,645,449 A | 7/1997 | Sabo | |
| 5,676,566 A | 10/1997 | Carlson, Jr. et al. | |
| 5,734,776 A | 3/1998 | Puetz | |
| 5,735,714 A | 4/1998 | Orlando et al. | |
| 5,788,087 A | 8/1998 | Orlando | |
| 5,836,786 A | 11/1998 | Pepe | |
| 5,921,402 A | 7/1999 | Magenheimer | |
| 5,944,535 A | 8/1999 | Bullivant et al. | |
| 5,945,633 A | 8/1999 | Ott et al. | |
| 5,947,765 A | 9/1999 | Carlson, Jr. et al. | |
| 5,956,449 A | 9/1999 | Otani et al. | |
| 5,984,720 A | 11/1999 | Milner et al. | |
| 6,146,192 A * | 11/2000 | Cabalka et al. ........... 439/540.1 |
| 6,208,796 B1 | 3/2001 | Vigliaturo | |
| 6,231,380 B1 | 5/2001 | Cabalka et al. | |
| 6,236,795 B1 | 5/2001 | Rodgers | |
| 6,240,234 B1 | 5/2001 | Falkenberg et al. | |
| 6,242,698 B1 | 6/2001 | Baker, III et al. | |
| 6,350,148 B1 | 2/2002 | Bartolutti et al. | |
| 6,468,112 B1 | 10/2002 | Follingstad et al. | |
| 6,497,578 B1 | 12/2002 | Kwong et al. | |
| 6,537,106 B1 | 3/2003 | Follingstad | |
| 6,600,106 B1 | 7/2003 | Standish et al. | |
| 6,614,978 B1 | 9/2003 | Caveney | |
| 6,866,541 B1 | 3/2005 | Barker et al. | |

(Continued)

*Primary Examiner*—Tho D. Ta
(74) *Attorney, Agent, or Firm*—Robert A. McCann; Christopher S. Clancy

(57) ABSTRACT

An angled patch panel is mountable to a network rack. The angled patch panel includes a patch panel frame, rack mounting members provided on opposite longitudinal ends of the frame, and a plurality of connectors mountable on the frame. The frame has a first panel section and a second panel section angled relative thereto by an obtuse angle between 90° and 180°. The first and second panel sections each define a front surface, and the plurality of connectors are oriented at an acute angle α relative to the front surface of either the first or second panel sections.

3 Claims, 5 Drawing Sheets

U.S. PATENT DOCUMENTS

| | | |
|---|---|---|
| 6,916,199 B1 | 7/2005 | Follingstad |
| 6,918,786 B1 | 7/2005 | Barker et al. |
| 6,971,909 B1 * | 12/2005 | Levesque et al. ........ 439/540.1 |
| 6,981,893 B1 | 1/2006 | Barker et al. |
| 2005/0142910 A1 | 6/2005 | Leverque et al. |
| 2005/0142932 A1 | 6/2005 | Levesque et al. |

* cited by examiner

STAIR-STEPPED ANGLED PATCH PANEL

CROSS-REFERENCE TO RELATED APPLICATIONS

This application claims priority to U.S. Provisional Application Nos. 60/656,253, filed Feb. 25, 2005, and 60/765,316, filed Feb. 3, 2006, the entire contents of which are hereby incorporated by reference.

FIELD OF INVENTION

The present invention is directed to an angled patch panel for a network equipment rack and, more particularly, an angled patch panel having a plurality of connectors mounted at an acute angle relative to the faceplate surface. Preferably, the connectors are mounted substantially perpendicular to the plane of the network equipment rack.

DESCRIPTION OF RELATED ART

Angled patch panels are known in the art, as shown and described in U.S. Pat. No. 6,866,541. In prior angled patch panels, connectors are oriented orthogonal to the faceplate surface. This angled configuration allows cables exiting the front of the connectors to flow directly to one or more vertical cable managers located adjacent the network rack and, thus, eliminates the need for horizontal cable management.

However, prior angled patch panels have some drawbacks. Because the connectors extend rearward of the patch panel a substantial distance and are angled inward toward an imaginary center line due to their orthogonal orientation, there is a possibility of connector interference on the rear side of the patch panel near the center. Moreover, the plugs installed in the connectors at each end of the frame adjacent the mounting members are oriented at an acute angle to the vertical rails of the network rack. Thus, in high density patch panels such as the one shown in FIGS. 1–4 wherein the rows of connectors are closely spaced, it is difficult to access these plugs. However, orienting the connectors parallel to the vertical rails of the network rack alleviates this problem.

SUMMARY OF THE INVENTION

It is desirable to provide a patch panel with additional rear side connector and cabling clearance.

It is also desirable to provide a patch panel with better accessability to plugs installed in connectors adjacent the vertical rails of the network rack.

An angled patch panel is mountable to a network rack. The angled patch panel includes a patch panel frame, rack mounting members provided on opposite longitudinal ends of the frame, and a plurality of connectors mountable on the frame. The frame has a first panel section and a second panel section angled relative thereto by an obtuse angle between 90° and 180°. The first and second panel sections each define a front surface, and the plurality of connectors are oriented at an acute angle α relative to the front surface of either the first or second panel sections.

Preferably, the rack mounting members define a mounting plane M, and the acute angle α is substantially orthogonal to the mounting plane M. The acute angle α is oriented between an axis A orthogonal to the mounting plane M and an axis B orthogonal to the front surface of either the first or second panel sections.

Preferably, the frame includes a centerpiece at the intersection of the first and second panel sections.

DETAILED DESCRIPTION OF PREFERRED EMBODIMENTS

FIGS. 1–4 are directed to a high density angled patch panel utilizing four, twelve-position faceplates for a total of forty-eight ports in one rack unit. One rack unit is 1.75 inches high under the EIA/TIA standard. However, it is likewise contemplated that the patch panel may include any number of faceplates having any number of positions. For example, the patch panel may include only two, twenty-four position faceplates.

Figure 1:
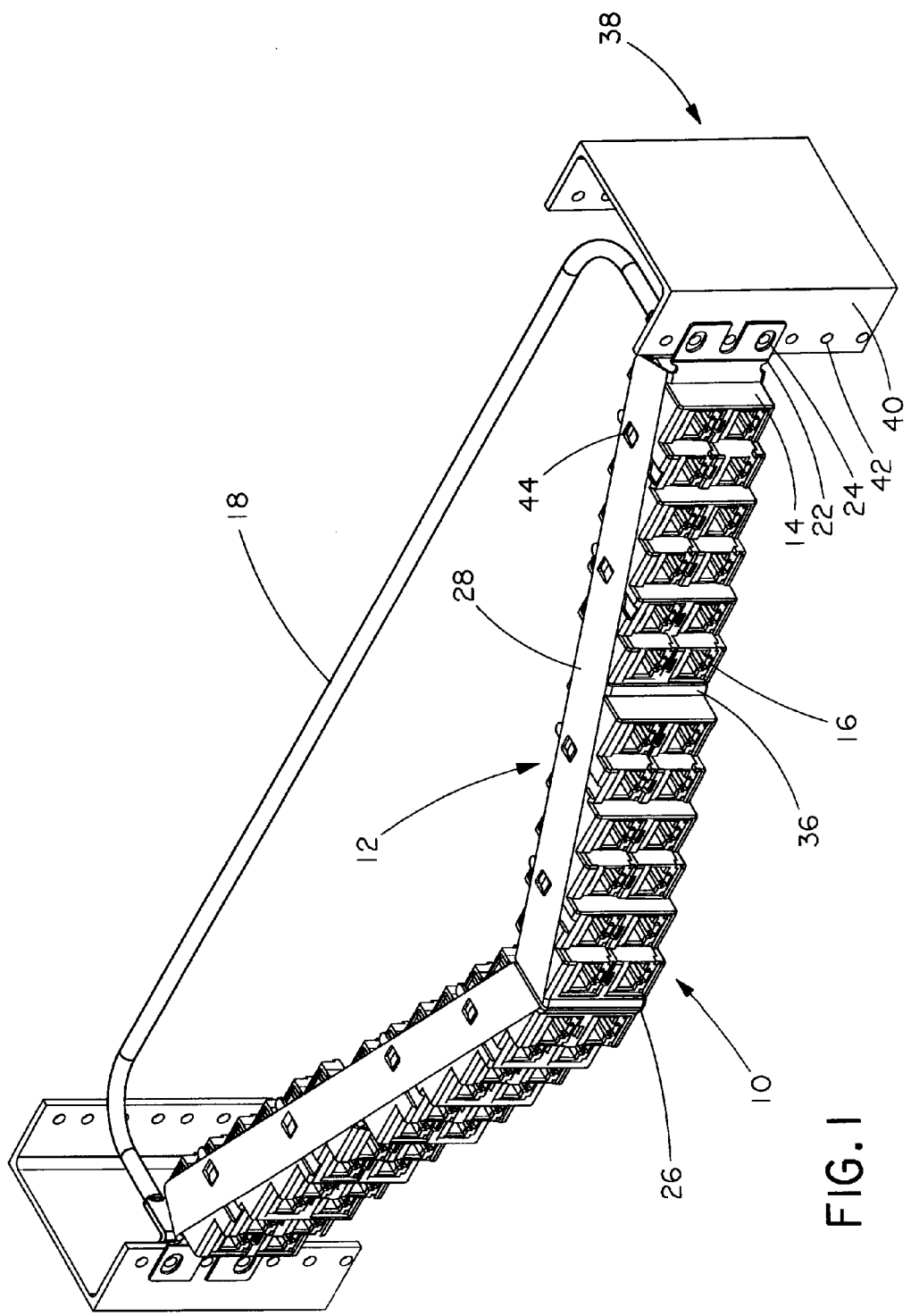
FIG. 1 shows a top right perspective view of a fully loaded angled patch panel and a cable support bar therefor according to the present invention.
Figure 2:
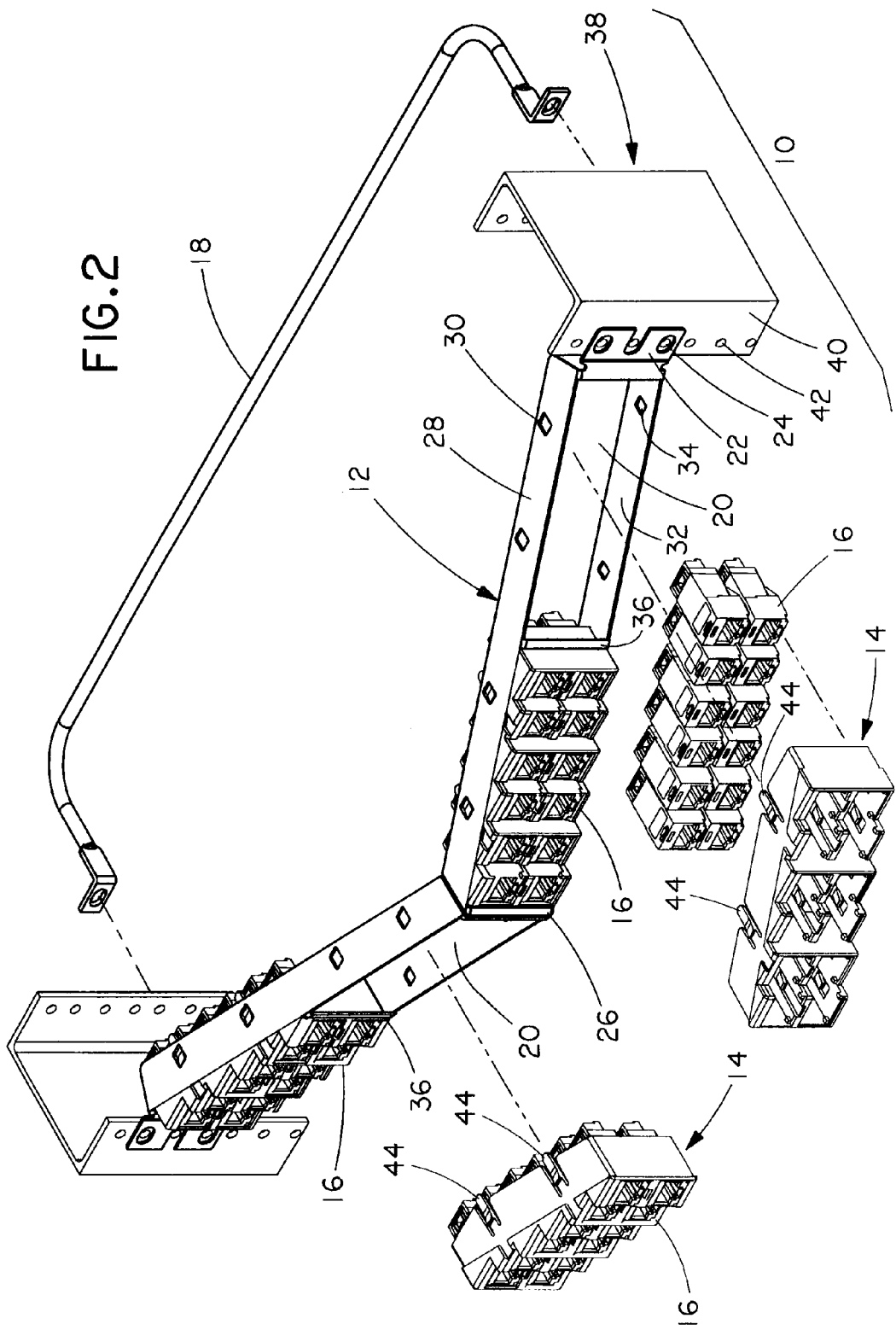
FIG. 2 shows a top right partial exploded perspective view of the angled patch panel and cable support bar of FIG. 1.

FIG. 1 shows a fully loaded high density angled patch panel 10. As best seen in FIG. 2, the patch panel 10 includes a frame 12, a plurality of faceplates, such as faceplate 14, and a plurality of connectors, such as connector 16. Moreover, a separate or integral cable support bar 18 may be provided on a rear side of the patch panel 10. Preferably, the frame 12 is metal, and the faceplate 14 is plastic. However, it is likewise contemplated that the frame 12 may be formed of any suitable rigid material, such as many plastics or composites.

The outwardly angled central frame 12 defines at least two angled faceplate surfaces, as the frame 12 has a plurality of faceplate openings 20 (see FIG. 2). The frame 12 also has a mounting member 22 at each end with a plurality of mounting apertures 24, as shown in FIGS. 1 and 2. The frame 12 further includes a centerpiece 26 located midway along the frame 12 to space the faceplate openings 20 on opposite halves of the central frame 12.

As shown in FIG. 2, the frame 12 has a top flange 28 including a plurality of rectangular apertures, such as aperture 30. Similarly, the frame 12 has a bottom flange 32 including a plurality of rectangular apertures, such as aperture 34. The apertures 30, 34 allow the faceplates 14 to be snapped into the rear side of the frame 12. Moreover, as best seen in FIG. 2, each half of the frame 12 includes a vertically-oriented separator portion 36 to add strength to the frame 12.

Both the frame 12 and the cable support bar 18 are designed to mount on a network rack 38. The frame 12 can be any size, but preferably is sized with a width W (see FIG. 3) to fit within a conventional network rack, such as a 19" or 23" EIA rack. The invention is not limited to such EIA racks, but is equally applicable to other known or subsequently developed racks. Moreover, the network rack 38 need not be an open frame structure as in the above EIA racks, but may include mounting cabinets or enclosures having mounting features and walls defining openings that can receive and affix rack elements, such as the frame 12 and vertical cable managers. The rack 38 has spaced vertical rails or legs 40 and various mounting openings 42 to facilitate equipment mounting. When mounted, the frame 12 protrudes out from the front of the rack 38 by a distance D of several inches, as shown in FIG. 3, due to the outwardly angled frame 12.

Figure 3:
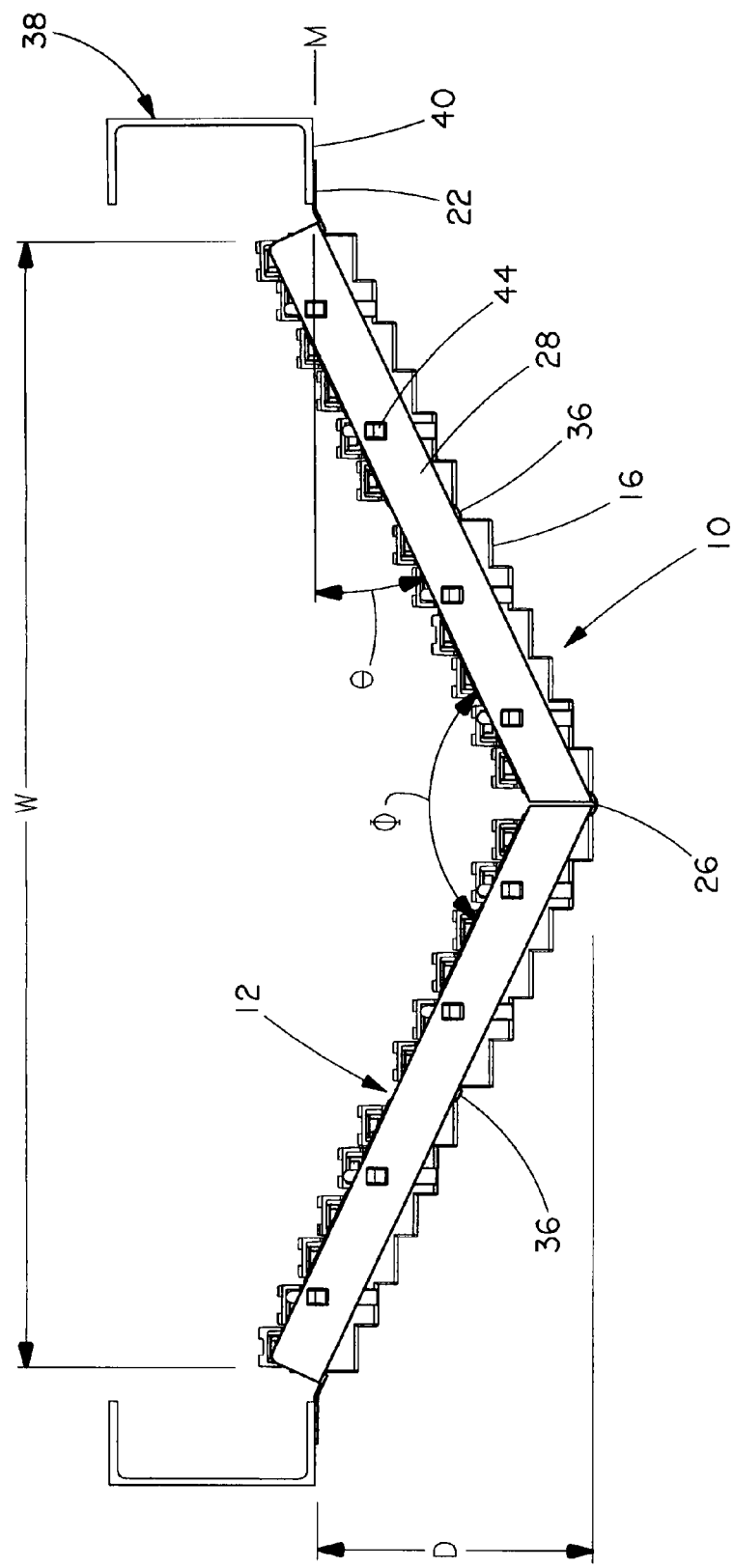
FIG. 3 shows a top view of the angled patch panel of FIG. 1.

FIG. 3 shows a top view of the angled frame 12. As shown therein, the frame 12 is angled outwardly in a generally inverted V-shape. Each half of the central frame 12 is preferably a mirror image and front faceplate surfaces thereof are angled from the other by an angle φ, which is an obtuse angle between about 90° and 180°, preferably an angle φ between about 100° to 140°, and more preferably an angle φ between about 110° and 130°. The illustrative embodiment shown has an angle φ of about 120°.

Each half of the frame 12 is also angled relative to the mounting members 22 at an angle θ and the mounting members 22 are oriented in the same plane and parallel to the mounting plane of the front sides of the vertical rails 40 of the network rack 38. The angle θ is an acute angle of preferably not more than 45°, preferably between about 20° to 40°, and more preferably between about 25° and 35°. In the illustrative example, the angle θ is about 30°. While the central frame 12 is shown and described as being symmetrical, it is to be understood that the patch panel sections could be disposed at different angles relative to the mounting members 22 and, thus, be of different lengths.

As shown in FIG. 2, the faceplate openings 20 receive faceplates 14, and faceplates 14 are sized to fit within the openings 20, preferably by snap fit. As best seen in FIG. 2, the faceplate 14 has two cantilever tabs 44 along a top surface thereof, and two cantilever tabs (not shown) along a bottom surface thereof. The cantilever tabs 44 engage with the apertures 30, 34 to allow the faceplate 14 to be snapped into the frame 12. However, rather than removable faceplates, faceplates 14 may be integrated into the frame 12. The faceplates 14 and the openings 20 may be multiple rack unit heights or may be sized as a single rack unit height, as shown.

FIG. 2 shows an exploded view of faceplate 14 loaded with twelve connectors 16. Two other faceplates 14 with connectors 16 are already loaded into the frame 12. In this illustrative example, the frame 12 has a total of four faceplates 14, each with a capacity of twelve connectors 16 for a total capacity of forty-eight connection ports in a one rack unit space. However, this is merely illustrative. Any number of faceplates 14 may be provided.

Connectors 16 may take many forms, such as electrical, optical, telecommunications-related or other known or subsequently developed connectors for connecting cabling. Preferred connectors are capable of connecting Unshielded Twisted Pair (UTP), Screened Twisted Pair (ScTP), coaxial and/or fiber optic cables used in the telecommunications industry to transmit data, voice, video and/or audio information. While twelve connectors 16 per faceplate 14 are shown, this is merely illustrative. Fewer or greater numbers of connectors 16 per faceplate 14 may be provided.

Figure 4:
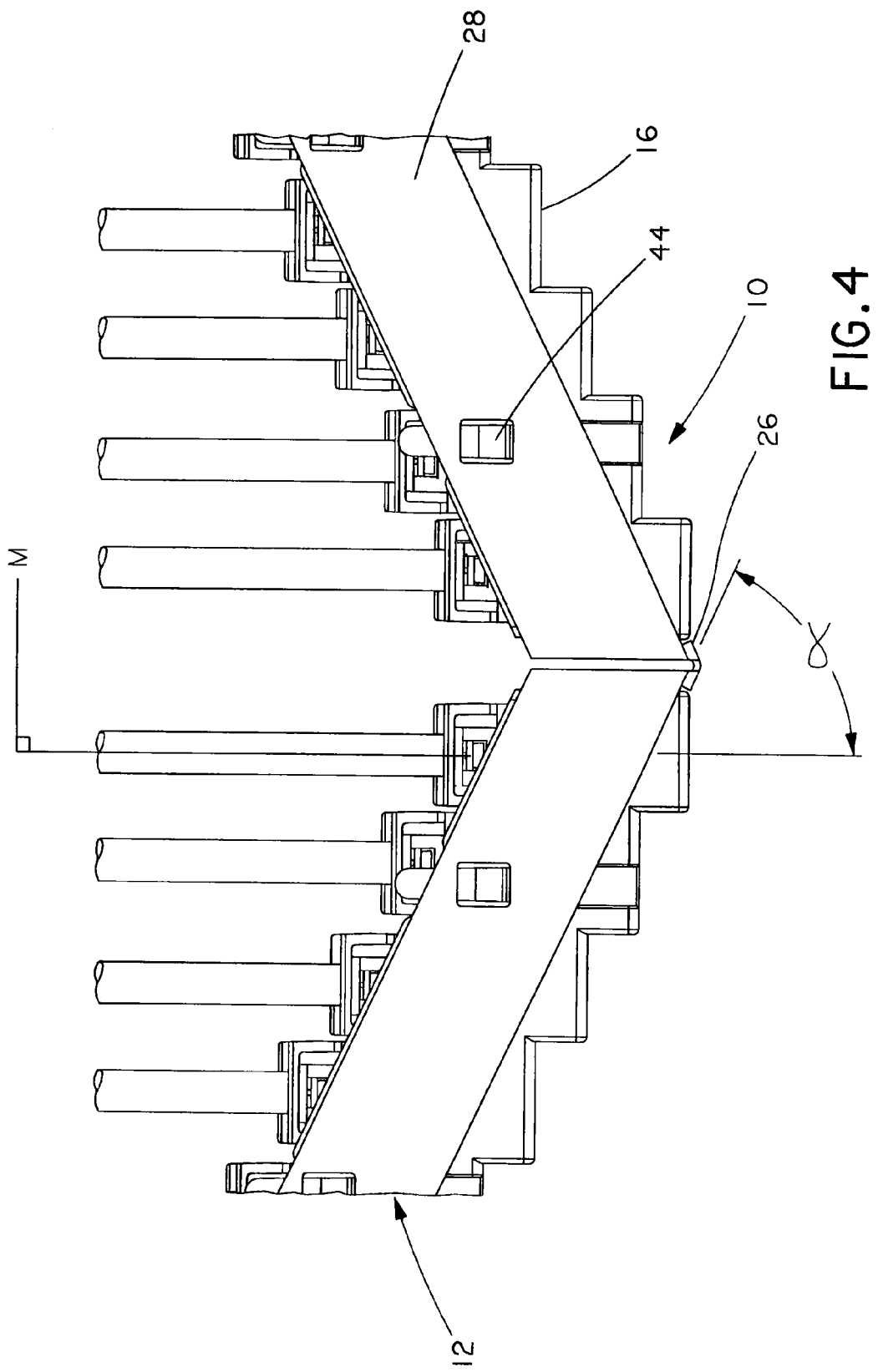
FIG. 4 shows a partial enlarged top view of the angled patch panel of FIG. 1.

As shown in FIG. 4, the connectors 16 are mounted and oriented at an acute angle α relative to the faceplate surface. That is, the connectors 16 have cable receiving surfaces oriented to longitudinally extend at an angle α and receive cabling on rear and front sides in line with this angle α. In this exemplary embodiment, angle α is substantially orthogonal to plane M (see FIG. 3), which is the mounting plane of vertical rails 40.

Figure 5:
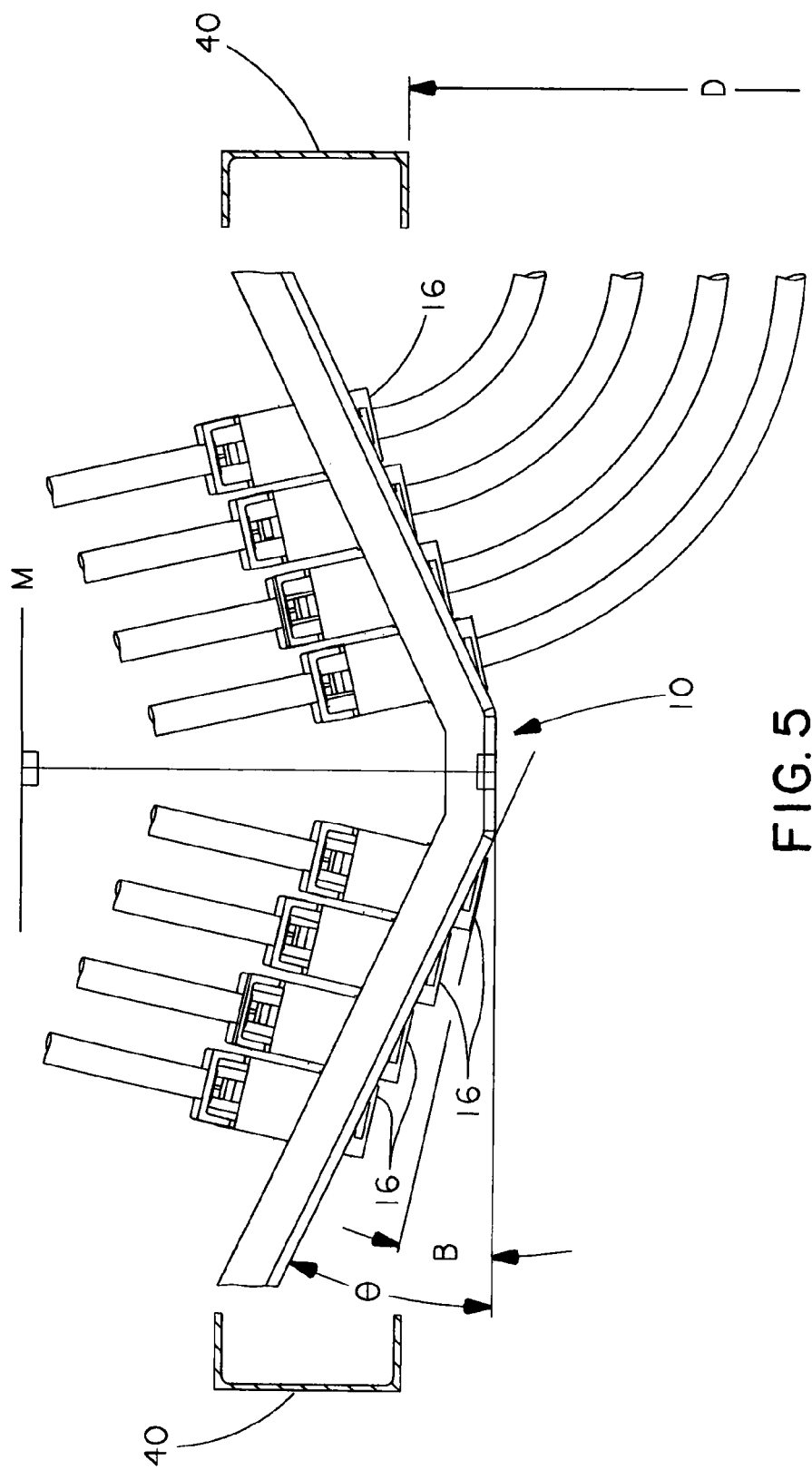
FIG. 5 shows a partial exploded top view of a second exemplary embodiment of a patch panel according to the invention, along with exemplary cable routing.

In a second exemplary embodiment, as shown in FIG. 5, angle β is an acute angle representing the angle between a plane extending across the front of a connector 16 and plane M. As in the first embodiment, θ is the angle at which a section of frame 12 is angled relative to plane M. In the embodiment shown in FIG. 3, for example, β would be 0°. In the embodiment of FIG. 5, β is at an acute angle between 0° and θ.

The aforementioned features work together to increase the functionality of the inventive patch panel. For example, the acutely angled connectors better manage the cabling on the rear side of the patch panel by reducing the interference of cabling on the rear side. Thus, by the acute angling, interference near an imaginary centerline rearward of centerpiece 26 can be eliminated. This arrangement can also provide improved front side cable management. For example, there may be better accessability to plugs installed in the connectors 16 adjacent the vertical rails 40 of the network rack 38.

While the invention has been shown and described in conjunction with specific exemplary embodiments, the invention is not limited to these. It will be obvious to those skilled in the art that changes and modifications may be made without departing from the teachings of this invention and that the matter set forth in the foregoing description and accompanying drawings is offered by way of illustration only and not as a limitation.

The invention claimed is:

1. An angled patch panel mountable to a network rack, comprising:

a patch panel frame having a longitudinal width sized to fit within the network rack, the frame having a first panel section and a second panel section angled relative thereto by an obtuse angle between 90° and 180°, the first and second panel sections each defining a front surface;

rack mounting members provided on opposite longitudinal ends of the frame defining a mounting plane (M); and a plurality of connectors mountable on the frame, the plurality of connectors being oriented at an acute angle (α) relative to the front surface of either the first or second panel sections.

2. The angled patch panel of claim 1, wherein the acute angle (α) is substantially orthogonal to the mounting plane (M).

3. The angled patch panel of claim 1, wherein the frame includes a centerpiece at the intersection of the first and second panel sections.

* * * * *